M. ZIMMERMAN.
WHEEL DRIVE.
APPLICATION FILED APR. 9, 1917.

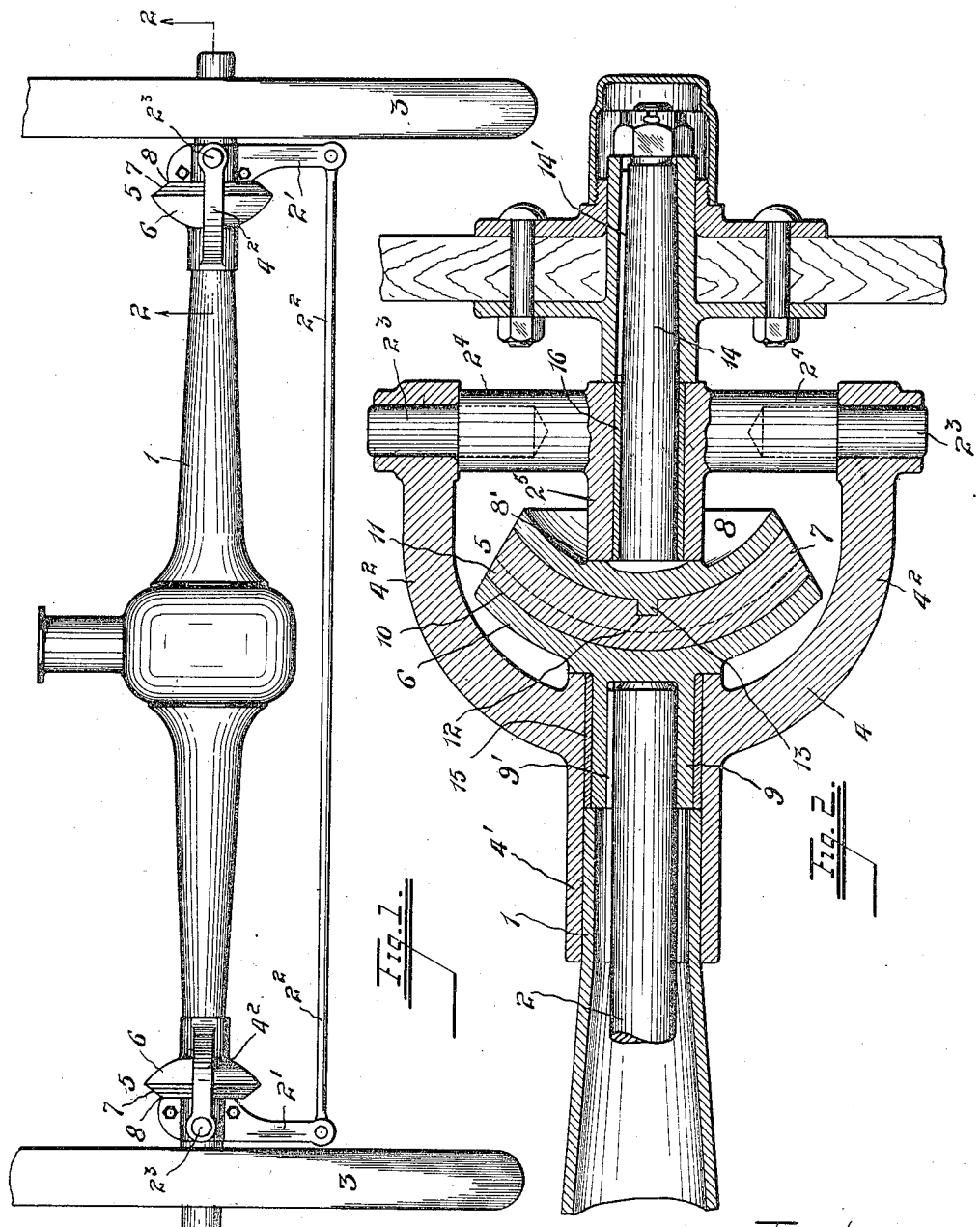

1,288,789.

Patented Dec. 24, 1918.
2 SHEETS—SHEET 2.

Inventor:
Martin Zimmerman
by Merkel and Saywell
his Attorneys

UNITED STATES PATENT OFFICE.

MARTIN ZIMMERMAN, OF JEROMESVILLE, OHIO.

WHEEL-DRIVE.

1,288,789. Specification of Letters Patent. Patented Dec. 24, 1918.

Application filed April 9, 1917. Serial No. 160,861.

*To all whom it may concern:*

Be it known that I, MARTIN ZIMMERMAN, a citizen of the United States, resident of Jeromesville, county of Ashland, and State of Ohio, have invented new and useful Improvements in Wheel-Drives, of which the following is a specification, the principle of the invention being herein explained and the best mode in which I have contemplated applying that principle, so as to distinguish it from other inventions.

My invention relates to wheel drives and particularly to that class of such mechanisms as are utilized in connection with automobile operation. More particularly, the invention relates to improvements adapted for use as a drive for the front wheels of an automobile.

By providing an efficient front wheel drive, I reduce considerably the liability of skidding and the wheels serve to pull the automobile instead of pushing it.

The annexed drawings and the following description set forth in detail certain means embodying my invention, the disclosed means, however, constituting but one of various mechanical forms in which the principle of the invention may be employed.

Figure 8:
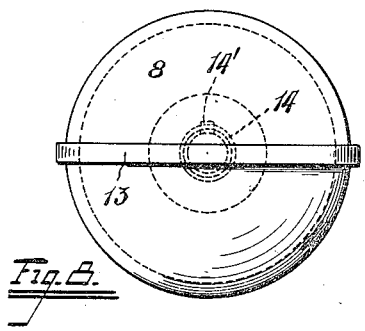
Figure 9:
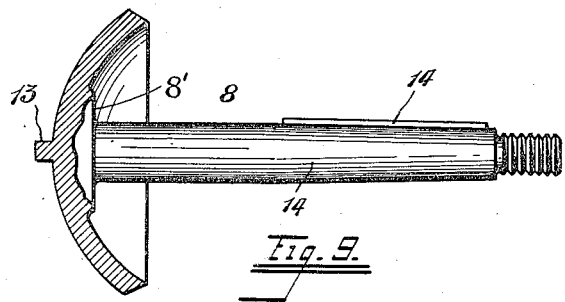
Figure 5:
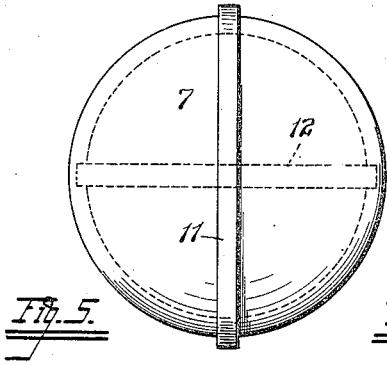
Figure 6:
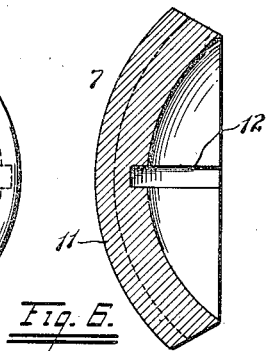
Figure 7:
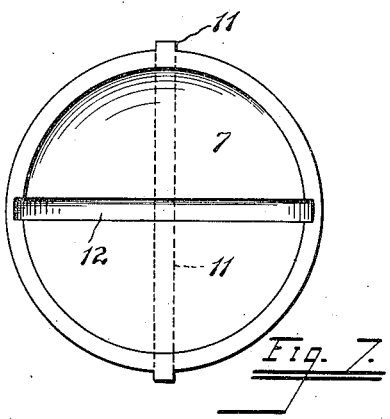
Figure 3:
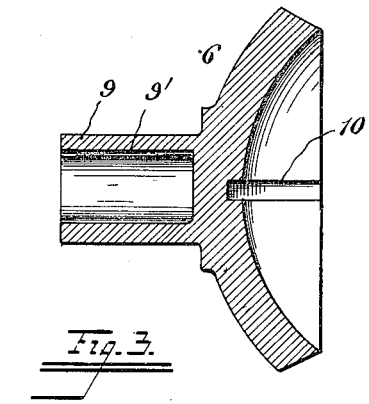
Figure 4:
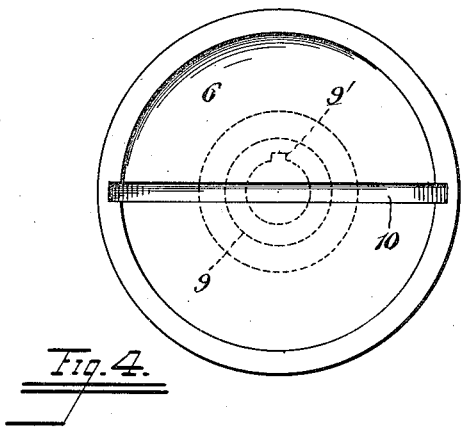

In said annexed drawings:

Figure 1 represents a plan view of steering means and a housing containing a suitable driving system actuating the two front wheels of an automobile through the medium of my invention; Fig. 2 represents, upon an enlarged scale, a vertical axial section taken in the plane indicated by the lines 2—2, Fig. 1; Figs. 3 to 9, inclusive, represent different views of the several elements of a universal joint forming a part of my improved wheel drive, in which Figs. 3 and 4 and Figs. 8 and 9 represent axial sections and end elevations of two outer elements of said universal joint, and Figs. 5, 6 and 7 represent, respectively, a front elevation, an axial section, and a rear elevation of an intermediate element of said universal joint.

Referring to the annexed drawings, Figs. 1 and 2, a suitable housing 1 is shown for the driving system of an automobile of which 2 represents the rotatable axle shaft. Steering arms 2' and a tie bar $2^2$ are also shown, as also two front wheels 3. Shrunk upon the housing 1 or otherwise suitably secured thereto is the hub member 4' of a yoke 4 rotatably receiving in the ends of each of its arms $4^2$ the journal parts $2^3$ of the lateral extensions $2^4$ of the steering arm 2', said arm being further provided with an extended hub portion $2^5$. Said steering arm 2' is centrally rotatably mounted relatively to said arms $4^2$ of said yoke 4, as hereinafter fully described. The rotatable driving shaft 2 is secured to the wheel 3 by a universal joint 5 which comprises the shell-shaped elements 6, 7 and 8, plainly shown in Figs. 3 to 9 inclusive. A hub member 9 of the element 6 is rotatably secured to the driving shaft 2 by the key 9', as plainly shown in Figs. 2, 3 and 4. Said element 6 is provided in its inner concave surface with a groove 10 within which there is adapted to slide a tongue 11 provided on the convex portion of the element 7, said element being in turn provided in its inner concave surface with a groove 12 within which is adapted to slide a tongue 13 provided on the outer convex surface of the element 8, all as plainly shown in Figs. 3 to 9 inclusive. The element 8 is provided with an axial portion 14 to which is secured by means of the key 14' the wheel 3. It will be apparent from the foregoing description that the rotation of the driving shaft 2 will, through the several elements of the universal joint 5, effect a corresponding rotation of the wheel 3. It will also be apparent that the element 7 is slidably movable relatively to the element 6, and that the element 8 is slidably movable relatively to the element 7 in a plane transverse to the plane in which the elements 6 and 7 are relatively movable. The steering knuckle 4 is provided with the brass bushings 15 and 16 disposed intermediately of said knuckle 4 and the elements 6 and 8, respectively, of the universal joint 5, within which bushings are journaled said elements 6 and 8, respectively. The elements 7 and 8 of the universal joint are movable in the arcs of two circles, respectively, whose radii are equal to the distances from the point of intersection of the axes of portion 14 and members $2^4$ to the outer convex surfaces of said elements 7 and 8, respectively. The element 8 is provided with a surface 8' within its concave portion against which the extended sleeve $2^5$ of the steering arm 2' bears, in order to maintain the elements of the universal coupling 5 in operative connection.

It will be apparent from the accompanying drawing and the foregoing description that the actuation of the steering arms 2' acting upon the wheels 3, will cause the journal members 2³ to correspondingly turn in the ends of the arms 4² of the fixed support or yoke 4 and that said turning action will be compensated for, relatively to the driving shaft 2, by the universal joint 5, the several shell elements of which will adjust themselves to an extent and in such planes as is required by the steering action.

Of course, my invention is adaptable for use as a four-wheel drive in the event it is desired to apply the same to the rear as well as the front wheels of an automobile.

What I claim is:

1. In a wheel drive, the combination with rotatable driving and driven means and an intermediate coöperating universal joint; of a steering knuckle directly connected to said driven means and provided with oppositely disposed arms extending radially from the axis of said driven means, a support for said arms comprising a hub member in which said driving means is rotatively mounted and arms to which said radial arms are pivotally connected, and means for holding the elements of said joint in operative relation.

2. In a wheel drive, the combination with rotatable driving and driven means and an intermediate coöperating universal joint; of a steering knuckle mounted upon said driven means and provided with oppositely disposed arms extended radially from the axis of said driven means, said arms being formed with journal portions, and a support for said arms comprising a hub member in which said driving means is rotatably mounted and two arms intersecting the plane containing said radial arms and formed with bearings for said journal portions, said knuckle being further formed with means bearing against said joint to maintain the elements thereof in operative relation.

Signed by me this 19" day of March, 1917.

MARTIN ZIMMERMAN.